(12) United States Patent
Yasue

(10) Patent No.: US 9,427,667 B2
(45) Date of Patent: *Aug. 30, 2016

(54) GAME SYSTEM

(71) Applicant: KABUSHIKI KAISHA SQUARE ENIX, Tokyo (JP)

(72) Inventor: Tai Yasue, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/585,547

(22) Filed: Dec. 30, 2014

(65) Prior Publication Data

US 2015/0111628 A1   Apr. 23, 2015

Related U.S. Application Data

(63) Continuation of application No. 13/738,203, filed on Jan. 10, 2013, now Pat. No. 8,951,126.

(30) Foreign Application Priority Data

Jan. 31, 2012   (JP) ................................. 2012-019119

(51) Int. Cl.
*A63F 13/00* (2014.01)
*A63F 13/56* (2014.01)
(Continued)

(52) U.S. Cl.
CPC .............. *A63F 13/56* (2014.09); *A63F 13/12* (2013.01); *A63F 13/327* (2014.09); *A63F 13/69* (2014.09); *A63F 13/822* (2014.09); *A63F 13/5372* (2014.09); *A63F 13/825* (2014.09); *A63F 13/92* (2014.09); *A63F 2300/204* (2013.01);
(Continued)

(58) Field of Classification Search
None
See application file for complete search history.

(56) References Cited

U.S. PATENT DOCUMENTS 6,045,447 A * 4/2000 Yoshizawa ............. A63F 13/10
463/31
7,491,124 B2   2/2009 Tanaka et al.
(Continued)

FOREIGN PATENT DOCUMENTS

EP   1493474   1/2005
JP   2002-233668   8/2002
(Continued)

OTHER PUBLICATIONS

U.S. Appl. No. 13/627,304 to Syuhei Yamaguchi, filed Sep. 26, 2012.
(Continued)

*Primary Examiner* — Sunit Pandya
(74) *Attorney, Agent, or Firm* — Greenblum & Bernstein, P.L.C.

(57) ABSTRACT

A game system is provided in which, when data is transmitted to a game apparatus of a receiver side, the influence which the transmitted data has on a game progressing in the game apparatus of the receiver side is diversified and the interest of the game is increased. The game apparatus includes a display in which a field map represents all or part of a game field in a plan view as seen from the above. A placement request icon is displayed on the display. When touching the placement request icon, a sub-character can be placed at a position where a main character is located. When a sub-character icon is selected and content of an event is determined, the sub-character is placed. When a communication connection with a different game apparatus is established, information related to the placed sub-character is transmitted.

7 Claims, 7 Drawing Sheets

(51) Int. Cl.
    *A63F 13/30*         (2014.01)
    *A63F 13/69*         (2014.01)
    *A63F 13/327*       (2014.01)
    *A63F 13/822*       (2014.01)
    *A63F 13/92*         (2014.01)
    *A63F 13/825*       (2014.01)
    *A63F 13/5372*      (2014.01)

(52) U.S. Cl.
    CPC .... *A63F2300/306* (2013.01); *A63F 2300/405* (2013.01); *A63F 2300/552* (2013.01); *A63F 2300/807* (2013.01)

(56) References Cited

U.S. PATENT DOCUMENTS

| | | | |
|---|---|---|---|
| 8,317,621 B2 | 11/2012 | Yasue | |
| 8,360,877 B2 | 1/2013 | Matsumura | |
| 2004/0259642 A1 | 12/2004 | Tanaka et al. | |
| 2005/0021159 A1* | 1/2005 | Ogawa | A63F 13/12 700/91 |
| 2008/0280684 A1* | 11/2008 | McBride | A63F 13/12 463/42 |
| 2009/0124393 A1 | 5/2009 | Tanaka et al. | |
| 2010/0315352 A1* | 12/2010 | Hamamura | G06F 3/0486 345/173 |
| 2011/0190061 A1* | 8/2011 | Takeda | A63F 13/02 463/39 |
| 2012/0015730 A1* | 1/2012 | Watkins, Jr. | A63F 13/12 463/36 |
| 2012/0202593 A1* | 8/2012 | Ito | A63F 13/10 463/31 |
| 2012/0264520 A1* | 10/2012 | Marsland | H04L 67/38 463/42 |
| 2012/0309523 A1* | 12/2012 | Yamashita | A63F 13/10 463/31 |
| 2014/0135123 A1 | 5/2014 | Tanaka et al. | |

FOREIGN PATENT DOCUMENTS

| | | |
|---|---|---|
| JP | 2002-239216 | 8/2002 |
| JP | 2002-325971 | 11/2002 |
| JP | 2005-028103 | 2/2005 |
| JP | 2009-112708 | 5/2009 |

OTHER PUBLICATIONS

U.S. Appl. No. 13/548,636 to Hajime Tabata, filed Jul. 13, 2012.
U.S. Appl. No. 13/688,506 to Takashi Tokita et al., filed Nov. 29, 2012.
Office Action from Japan Patent Office (JPO) in Japanese Patent Application No. 2012-019119, dated Nov. 26, 2013, along with an English language translation thereof.
Extended European Search Report (EESR) from European Patent Office (EPO) in European Patent Application No. 13150853.3, dated Jan. 8, 2015.
Gameplays et al., "PSP: Bomberman Multiplayer Gameplay", XP054975643, retrieved from the Internet at: URL:https://www.youtube.com/watch?v=IIZ3QvttBoA, retrieved on Dec. 10, 2014 (Jan. 16, 2011).

* cited by examiner

| NAME | TYPE | LEVEL | OFFENSIVE POWER | DEFENSIVE POWER | PHYSICAL STRENGTH VALUE | PLACED POSITION | EVENT |
|---|---|---|---|---|---|---|---|
| SUB-CHARACTER A | MONSTER A | 12 | 36 | 24 | 48 | AREA 12 X, Y = 76.54 | FIGHT, GUARD, 3 TIMES |

| NAME | TYPE | LEVEL | OFFENSIVE POWER | DEFENSIVE POWER | PHYSICAL STRENGTH VALUE | PLACED POSITION | EVENT |
|---|---|---|---|---|---|---|---|
| SUB-CHARACTER B | MONSTER B | 8 | 25 | 22 | 31 | AREA 3 X, Y = 5.22 | FIGHT, DAMAGE, PROHIBIT |

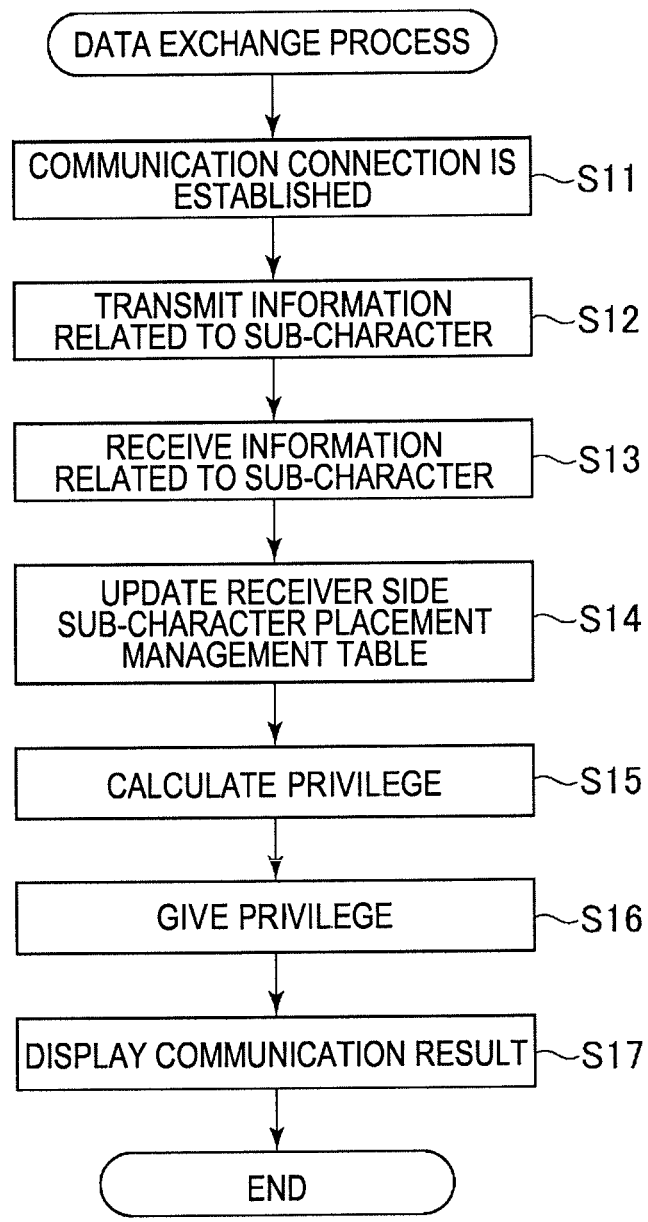

Fig. 8

| MISSION | EFFECT OF PARAMETER IMPROVEMENT |
|---|---|
| GUARD SUCCESSFULLY THREE TIMES | INCREASE OFFENSIVE POWER |
| PROHIBIT THREE OR MORE DAMAGES | INCREASE MAGIC POWER |
| PROHIBIT USE OF COMMAND OTHER THAN ATTACK COMMAND | INCREASE DEFENSIVE POWER |
| PROHIBIT USE OF COMMAND OTHER THAN MAGIC COMMAND | IMPROVE MAGIC RESISTANCE |
| CONQUER WITHIN 30 SECONDS | IMPROVE ACQUISITION RATE OF EXPERIENCE POINTS |
| CONQUER BY LINK COMMAND | IMPROVE ITEM DROP RATE |

Fig. 9

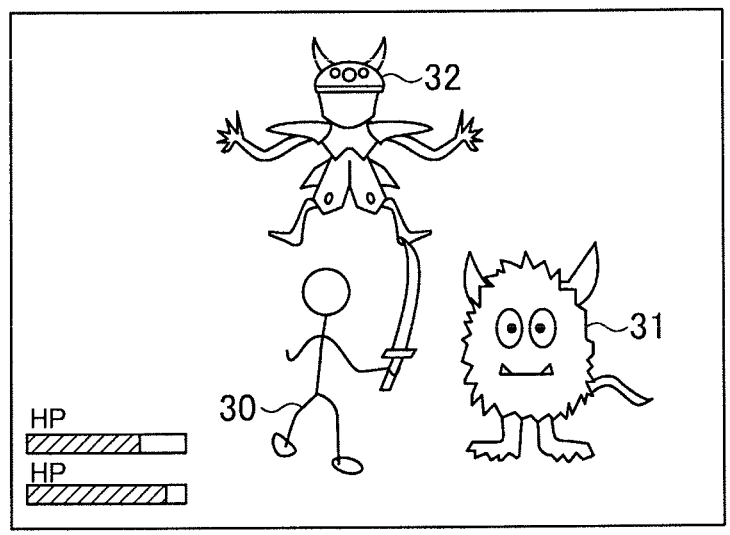

| | WINNING EVALUATION | 1 | 2 | 3 | 4 | 5 |
|---|---|---|---|---|---|---|
| DEGREE OF DIFFICULTY | C | LESS THAN 10 | 10 OR MORE AND LESS THAN 15 | 15 OR MORE AND LESS THAN 20 | 20 OR MORE AND LESS THAN 25 | 25 OR MORE |
| | B | LESS THAN 20 | 20 OR MORE AND LESS THAN 30 | 30 OR MORE AND LESS THAN 40 | 40 OR MORE AND LESS THAN 50 | 50 OR MORE |
| | A | LESS THAN 40 | 40 OR MORE AND LESS THAN 55 | 55 OR MORE AND LESS THAN 70 | 70 OR MORE AND LESS THAN 85 | 85 OR MORE |

GAME SYSTEM

CROSS REFERENCE TO RELATED APPLICATION

This is a continuation application of U.S. patent application Ser. No. 13/738,203, filed Jan. 10, 2013, which claims the benefit of Japanese Patent Application No. 2012-019119, filed on Jan. 31, 2012. The disclosure of each of the above-identified applications, including the specification, drawings, and claims, is incorporated herein by reference in its entirety.

BACKGROUND OF THE INVENTION

1. Field of the Invention

The present invention relates to a game system which includes a plurality of game apparatuses that can connect and communicate with each other and in which when data is transmitted and received between the game apparatuses by short-range communication, it is possible to diversify the influence which the received data has on the game.

2. Description of the Related Art

Conventionally, short-range communication is performed between a plurality of game apparatuses by using wireless communication units, and information that can be used when the game progresses is exchanged between them (for example, see Japanese Patent Application Laid-Open No. 2005-28103). For example, information related to a player character operated in another game apparatus and information related to an item held by the player character are exchanged between the game apparatuses, and the interest of the game is increased by using the short-range communication.

However, when only exchanging data that can be used in the game, a player cannot select what influence the data has when the data is transmitted to a receiver, and the influence which the data has on the game progressing in the game apparatus of the data receiver is uniform.

SUMMARY OF THE INVENTION

An object of the present invention is to solve the above problem. Specifically, the object of the present invention is to provide a game system in which when data is transmitted to the game apparatus of the receiver side, the influence which the transmitted data has on the game progressing in the game apparatus of the receiver side is diversified and the interest of the game is increased.

The present invention relates to a game system comprising: a first game apparatus and a second game apparatus which can connect and communicate with each other, wherein a game, which progresses in the first game apparatus and the second game apparatus, progresses by moving a player character assigned to each game apparatus on a game field, the first game apparatus includes a first object placer that places an object on an arbitrary position on the game field when the game progresses, and an object information transmitter that transmits object information related to the object placed by the first object placer and the position where the object is placed to the second game apparatus, and the second game apparatus includes an object information receiver that receives the object information from the first game apparatus, a second object placer that places an object corresponding to the object placed in the first game apparatus at a position on the game field corresponding to a position where the object is placed in the first game apparatus according to the object information received by the object information receiver, a player character mover that moves a second player character assigned to the second game apparatus on the game field according to an operation to an operation section by a player, and an event generator that generates an event at the position where the object is placed by the second object placer.

While a game progresses in the first game apparatus, when an object is placed at an arbitrary position on the game field, if data is transmitted and received between the first game apparatus and the second game apparatus, information related to the object and the position at which the object is placed is transmitted to the second game apparatus. In the second game apparatus, an object is placed according to the information received from the first game apparatus, and when a player character reaches a position on the game field at which the object is placed, an event occurs.

In this way, also in the second game apparatus that receives data, an object is placed at a position corresponding to the position at which the object is placed in the first game apparatus, so that if the position at which the object is placed in the first game apparatus changes, a position at which the player character encounters the object in the second game apparatus also changes, and thus, it is possible to diversify the influence that affects the game progressing in the second game apparatus.

In the present invention, it is preferable that the object is a first player character assigned to the first game apparatus or a first sub-character that acts in cooperation with the first player character.

It is possible to place a player character (hereinafter referred to as "main character") operated mainly by the player or a sub-character in cooperation with the player character at a predetermined position in the first game apparatus and transmit information related to the player character or the sub-character to the second game apparatus. In the second game apparatus, it is possible to generate an event related to the player character or the sub-character in the first game apparatus.

In the present invention, it is preferable that the event is a virtual battle between the first player character or the first sub-character and the second player character.

Different from simply exchanging data between the first game apparatus and the second game apparatus, in the second game apparatus, when the player character or the sub-character placed in the first game apparatus encounters a player character of the second game apparatus, they can fight against each other, so that it is possible to give a feeling as if fighting a communication battle to a player even though it is not a real-time battle. In addition, the player cannot expect where the player character encounters the player character or the sub-character of the first game apparatus, so that the interest of the game increases.

In the present invention, it is preferable that the event is a virtual battle between the second player character and an enemy character, and the first player character or the first sub-character fights the battle in cooperation with the second player character.

In the second game apparatus, when fighting a virtual battle against an enemy character such as a boss character, it is possible to obtain cooperation of the player character or the sub-character placed in the first game apparatus, so that when fighting a virtual battle against the enemy character, unexpected help can be obtained, and thus the interest of the game can be increased.

In the present invention, it is preferable that the first game apparatus includes a privilege giver that gives a privilege to the first player character or the first sub-character when the object information transmitter transmits the object information to the second game apparatus.

The player character or the sub-character operated in the first game apparatus is placed, so that a privilege can be given such as providing a virtual currency and an item or improving parameters related to the characters such as experience points or the like to the characters. Therefore, the player is motivated to dispatch his or her characters to other game apparatuses. When the object information is transmitted to the second game apparatus, the player character or the sub-character placed in the first game apparatus does not fight a virtual battle. However, by giving privilege in this way, it is possible to give a feeling as if a virtual battle was fought to the player.

In the present invention, it is preferable that the first object placer includes an event decider that decides content of the event generated in the second game apparatus, the object information transmitter transmits event information related to the content of the event decided by the event decider along with the object information, the object information receiver receives the event information along with the object information, and the event generator generates an event corresponding to the event information.

When placing an object, the player who operates the first game apparatus can determine the content of the event generated in the second game apparatus, so that it is possible to diversify the influence which the transmitted data has on the game progressing in the second game apparatus.

In the present invention, it is preferable that the first game apparatus and the second game apparatus establish communication when the first game apparatus and the second game apparatus are located in a range in which the first game apparatus and the second game apparatus can connect and communicate with each other, and the first game apparatus and the second game apparatus automatically transmit and receive the object information to and from each other.

The information related to the placed object is automatically exchanged with other game apparatuses by short-range communication, so that it is possible to exchange object information with an unspecified number of game apparatuses, and thus, it is possible to diversify the influence which the received information has on the game.

The present invention relates to a game apparatus which can connect and communicate with a different game apparatus and which proceeds with a game by moving a player character on a game field, the game apparatus comprising: an object information receiver that receives object information related to an object placed at an arbitrary position on the game field and the position at which the object is placed from the different game apparatus when a game of the different game apparatus progresses; an object placer that places an object corresponding to the object placed in the different game apparatus at a position on the game field corresponding to a position where the object is placed in the different game apparatus according to the object information received by the object information receiver; a player character mover that moves a player character on the game field according to an operation to an operation section by a player; and an event generator that generates an event at the position where the object is placed by the object placer.

The present invention relates to a game program that causes a computer apparatus to execute a game that progresses by moving a player character on a game field, the game program causing the computer apparatus to function as: an object information receiver that receives object information related to an object placed at an arbitrary position on a game field and the position at which the object is placed from a different computer apparatus when a game of the different computer apparatus progresses; an object placer that places an object corresponding to the object placed in the different computer apparatus at a position on the game field corresponding to a position where the object is placed in the different computer apparatus according to the object information received by the object information receiver; a player character mover that moves a player character on the game field according to an operation to an operation section by a player; and an event generator that generates an event at the position where the object is placed by the object placer.

The present invention relates to a game progress method that proceeds with a game by moving a player character on a game field in a computer apparatus, the game progress method causing the computer apparatus to execute: a step of receiving object information related to an object placed at an arbitrary position on a game field and the position at which the object is placed from a different computer apparatus when a game of the different computer apparatus progresses; a step of placing an object corresponding to the object placed in the different computer apparatus at a position on the game field corresponding to a position where the object is placed in the different computer apparatus according to the received object information; a step of moving a player character on the game field according to an operation to an operation section by a player; and a step of generating an event at the position where the object is placed.

BRIEF DESCRIPTION OF THE DRAWINGS

FIG. 7 is a diagram showing a flowchart of a data exchange process;

FIG. 8 is a diagram showing an example of a relationship between a mission and a privilege that the sub-character can acquire;

FIG. 9 is a diagram showing an example of a game image displayed on a first display of the game apparatus according to the embodiment of the present invention;

DETAILED DESCRIPTION OF EMBODIMENTS

Figure 1:
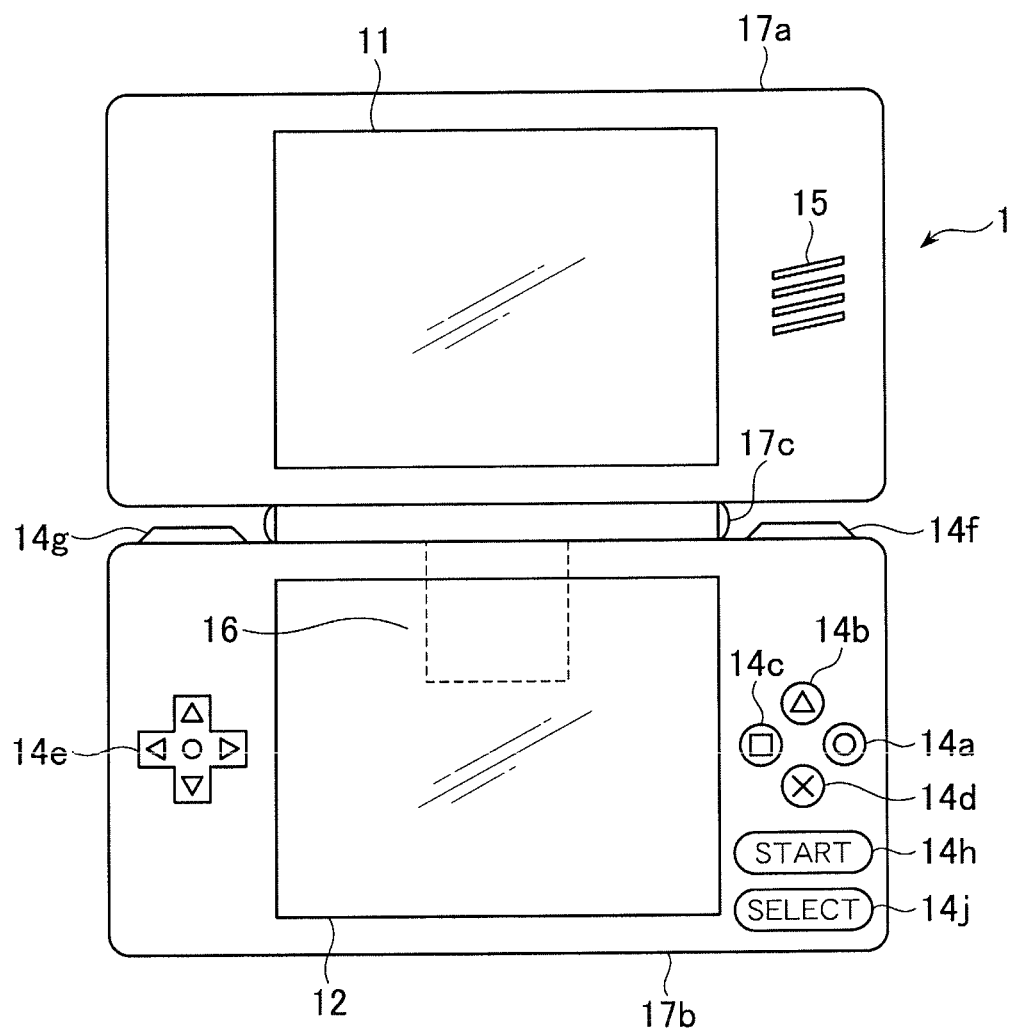
FIG. 1 is an external view of a game apparatus according to an embodiment of the present invention.

Hereinafter, an embodiment of the present invention will be described with reference to the drawings. FIG. 1 is an external view showing a configuration of a game apparatus applied to the embodiment. In a portable type game apparatus 1, a first display 11 is housed in an upper housing 17a and a second display 12 is housed in a lower housing 17b. A hinge section 17c is provided on the lower hem of the upper housing 17a and connected to the upper hem of the lower housing 17b, so that the upper housing 17a and the lower housing 17b can be opened and closed freely. Sound holes of a speaker 15 are formed at the right of the first display 11 of the upper housing 17a.

On the first display 11, for example, a two-dimensional game image obtained by perspectively transforming a situation in a three-dimensional virtual space by using a virtual screen is displayed. Although not shown in FIG. 1, a touch panel is provided on the upper surface of the second display 12. The touch panel is a device to detect a coordinate position on the touch panel by pressing the touch panel by a stick or a finger or by moving a stick on the touch panel. On the second display 12, for example, a field map obtained by reducing all or part of the virtual space and displaying the reduced virtual space on a plane surface is displayed.

An operation section 14 includes a circle button 14a, a triangle button 14b, a square button 14c, and a cross button 14d, which are operation buttons, a cross key 14e which is a direction indicating switch, a start button 14h, a select button 14j, and an L button 14g and an R button 14f which are side switches. The circle button 14a, the triangle button 14b, the square button 14c, and the cross button 14d are arranged at the right of the second display 12 in the lower housing 17b. The cross key 14e is arranged at the left of the second display 12 in the lower housing 17b. The L button 14g and the R button 14f are arranged on the left end and the right end of the upper hem of the lower housing 17b and used to input a predetermined instruction as needed.

On the side surface of the upper hem of the lower housing 17b, a cartridge insertion section is provided, into which a cartridge 16, which is a storage medium storing a game program, can be inserted. A connector 28 for connecting to the cartridge 16 is included inside the cartridge insertion section.

Figure 2:
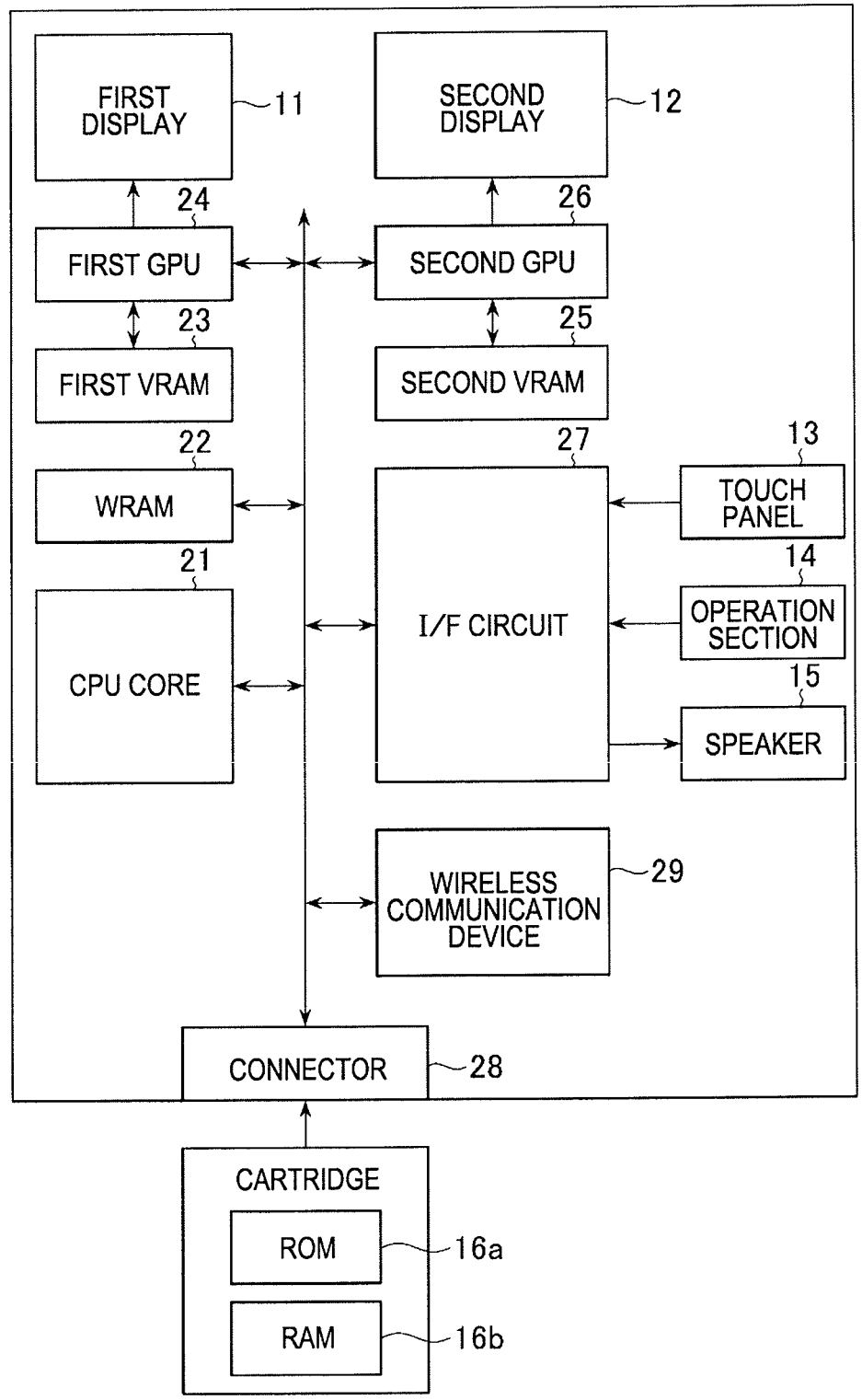
FIG. 2 is a block diagram showing a configuration of the game apparatus according to the embodiment of the present invention.

Next, a circuit configuration of the game apparatus 1 will be described. FIG. 2 is a block diagram showing a configuration of the game apparatus 1. A CPU core 21 is mounted on an electronic circuit board which is housed in the housing 17. The CPU core 21 is connected to a working RAM (WRAM) 22, a first graphic processing unit (first GPU) 24, a second graphic processing unit (second GPU) 26, an input/output interface (I/F) circuit 27, and the connector 28. The CPU core 21 can be connected to the cartridge 16 through the connector 28. The CPU core 21 includes a ROM storing a system program and an internal timer. The I/F circuit 27 is a circuit which transmits and receives data between the CPU core 21 and external input/output devices such as a touch panel 13, the operation section 14, and the speaker 15.

The cartridge 16 is a storage medium storing a game program and includes a ROM 16a that stores the game program and a RAM 16b in which backup data can be rewritten. The game program stored in the ROM 16a of the cartridge 16 is loaded into the WRAM 22 and the loaded game program is executed by the CPU core 21. Temporary data obtained when the CPU core 21 executes the game program and data for generating an image are stored in the WRAM 22.

The first GPU 24 (hereinafter a video RAM of the first GPU 24 is referred to as "first VRAM") and the second GPU 26 (hereinafter a video RAM of the second GPU 26 is referred to as "second VRAM") generate a game image on the basis of the data stored in the WRAM 22 for each frame unit (for example, for each ⅟30 second) and draw the game image in a first VRAM 23 and the second VRAM 25. The first GPU 24 and the second GPU 26 display the game images drawn in the first VRAM 23 and the second VRAM 25 respectively on the first display 11 and the second display 12 on the basis of an instruction from the CPU core 21.

A wireless communication device 29 is connected to a communication network through a wireless communication port and can communicate with a different game apparatus and a server apparatus through the Internet. Also, the wireless communication device 29 can communicate with a different game apparatus and a server apparatus by radio through a communication unit including an antenna.

Figures 3, 4, 5:
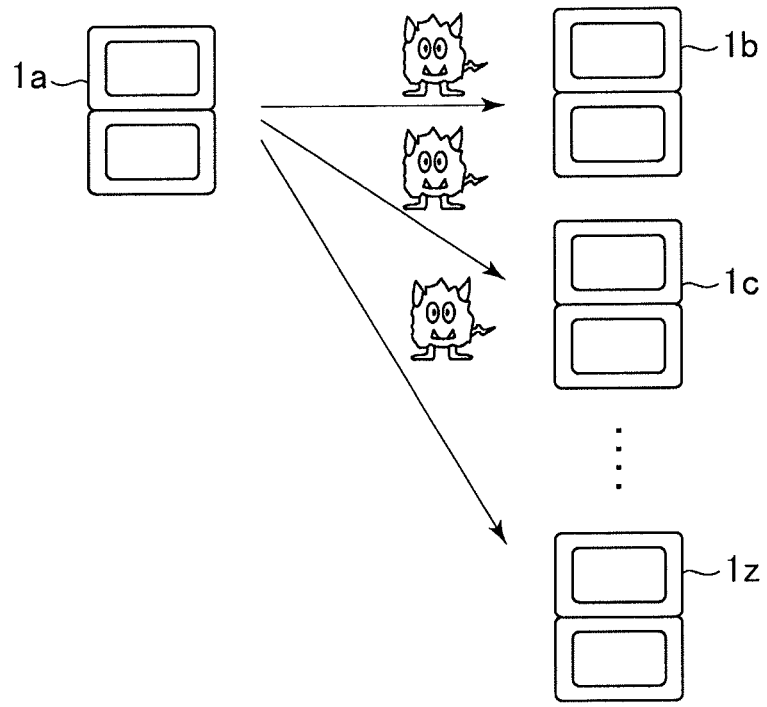
FIG. 3 is a diagram showing an outline of the game system according to the embodiment of the present invention.
FIG. 4 is a diagram showing an example of a transmitter side sub-character placement management table.
FIG. 5 is a diagram showing an example of a receiver side sub-character placement management table.

Next, the game system of the present invention will be described. FIG. 3 is a diagram showing an outline of the game system according to the embodiment of the present invention. In the progress of the game, a player of each game apparatus 1 mainly operates a main character which is a target of the operation and moves the main character on a game field in the virtual space to proceed with the game. The main character moves on the game field, taking an animal type or a monster type sub-character with him or her. When the main character encounters an enemy character, the main character can cause the sub-character, which the main character is taking with him or her, to take part in a battle, so that the main character and the sub-character can battle against the enemy character in cooperation with each other.

In a game apparatus 1a, it is possible to place the sub-character at an arbitrary position on the game field and dispatch the sub-character to a different game apparatus 1. When an operation to dispatch the sub-character is performed by an operation of a player to the operation section 14, the sub-character is placed at a position where the main character is located. Therefore, the player may move the main character to a position where the player wants to place the sub-character and then place the sub-character.

When distances between a main body of the game apparatus 1a and main bodies of other game apparatuses 1b to 1z are in a range in which short-range communication can be performed, data are automatically exchanged by radio. When the sub-character is placed in the game apparatus 1a as an object to be dispatched, information related to the sub-character (for example, name, offensive power, defensive power, and physical strength value of the sub-character) and the position at which the sub-character is placed are transmitted to the game apparatus 1b to 1z which communicate with the game apparatus 1a.

Next, the transmitter side sub-character placement management table 40 will be described. FIG. 4 is a diagram showing an example of the transmitter side sub-character placement management table. The transmitter side sub-character placement management table 40 manages information related to a sub-character placed in one game apparatus 1 and is set in the WRAM 22. When the player places the sub-character at an arbitrary position on the game field, the information related to the sub-character is registered in the transmitter side sub-character placement management table 40. In the transmitter side sub-character placement management table 40, a name 41, a type 42, a level 43, offensive power 44, defensive power 45, a physical strength value 46, a placed position 47, and an event 48 are stored in association with each other for each placed sub-character.

The name 41 is the name of the sub-character. The type 42 identifies the type/tribe of the sub-character. The level 43 is a level of strength of the sub-character. The offensive power 44, the defensive power 45, and the physical strength value 46 are status information of the sub-character. The placed position 47 specifies an area and positional coordinates where the sub-character is placed in the one game apparatus 1. The event 48 is either "fight" or "cooperation" (described later). When the event 48 is "fight," the event 48 stores a type of set "mission" (described later).

FIG. 5 is a diagram showing an example of the receiver side sub-character placement management table. A receiver side sub-character placement management table 50 manages information related to a sub-character, which is placed in a different game apparatus 1 and which is received from the different game apparatus 1 by communication, and is set in the WRAM 22. In the receiver side sub-character placement management table 50, a name 51, a type 52, a level 53, offensive power 54, defensive power 55, a physical strength value 56, a placed position 57, and an event 58 are stored in association with each other for each placed sub-character. The name 51 to the event 58 correspond to the name 41 to the event 48, respectively, in the transmitter side sub-character placement management table 40.

For example, a communication connection between the game apparatus 1a and the game apparatus 1b is established, information related to the sub-character in the transmitter side sub-character placement management table 40 set in the game apparatus 1a is transmitted to the game apparatus 1b. Then, the information related to the sub-character received by the game apparatus 1b is stored in the receiver side sub-character placement management table 50 set in the game apparatus 1b.

When the information related to the sub-character is registered in the receiver side sub-character placement management table 50, the sub-character is placed at the "placed position 57" in the receiver side sub-character placement management table 50. A field map is displayed on the second display 12 and a balloon indicating that the sub-character is placed is displayed at a position corresponding to the position at which the sub-character is placed on the field map by referring to the receiver side sub-character placement management table 50. When the player touches the balloon displayed on the second display 12, an event such as a fight against the sub-character occurs.

Figure 6:
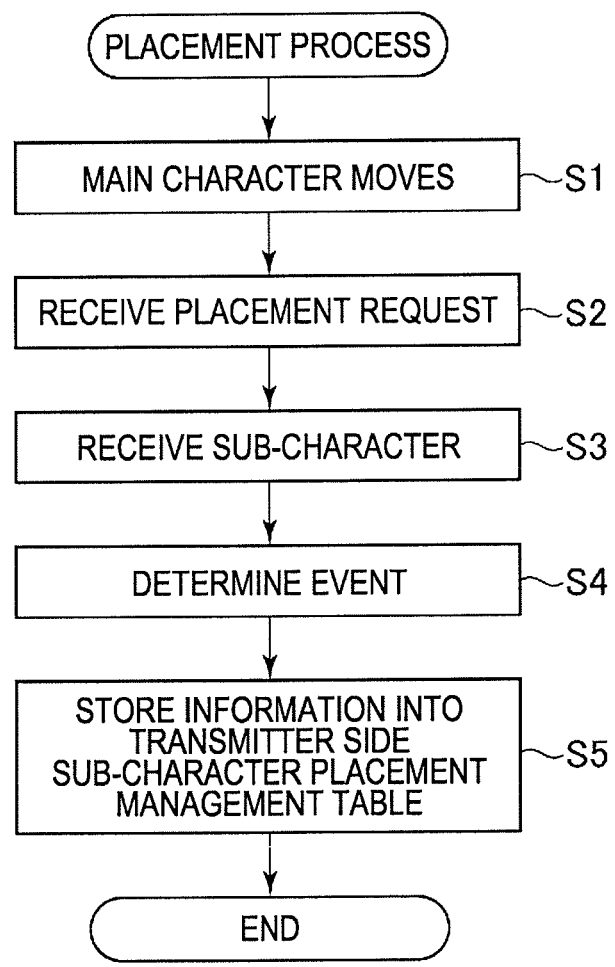
FIG. 6 is a diagram showing a flowchart of a placement process of a sub-character.

Next, a placement process of the sub-character will be described. FIG. 6 is a diagram showing a flowchart of placement process of the sub-character. First, the main character moves according to an operation of the player to the cross key 14e (step S1). Further, when a touch operation of the player to an icon (shown in FIG. 10) for a placement request of the sub-character on the touch panel of the display 12 is received (step S2), a selection of the sub-character to be dispatched can be performed. Next, when an icon (shown in FIG. 10) indicating a sub-character that is subordinate to the main character is touched, the selection of the sub-character is accepted (step S3). The number of sub-characters that can be placed at the same position is not limited to one, but a plurality of sub-characters may be placed.

Next, content of the event is determined according to an operation of the player to the operation section 14 (step S4). The determination of the content of the event is not only the selection of "fight" or "cooperation," but also when the "fight" is selected, a mission for the player of the receiver side to perform in addition to winning the virtual battle can be assigned. For example, the player can select a mission such as "guard successfully three times," "prohibit three or more damages" and "prohibit use of command other than attack command" as the content of the mission.

When the content of the event is determined in step S4, the information related to the sub-character received in step S3, the information related to the event determined in step S4, and the position information related to an area and positional coordinates where the main character is located at that time are stored in the transmitter side sub-character placement management table 40 (step S5) and the placement process of the sub-character is completed.

As described above, in step S4, when the player places the sub-character on the game field as an object to be dispatched, the player can select the content of the event in the game apparatus that receives the placed sub-character from a menu screen. For example, the player can select "fight" or "cooperation." When the "fight" is selected, the dispatched sub-character fights against the main character and the sub-character in the receiver side game apparatus. If the "cooperation" is selected, when a very strong enemy character such as a boss character and the main character in the game apparatus 1b battle against each other, a cooperation of the sub-character received from the game apparatus 1a can be obtained according to an operation of the player of the game apparatus 1b.

FIG. 7 is a diagram showing a flowchart of a data exchange process between the game apparatuses. Here, a case will be described in which the information related to the sub-character of the game apparatus 1a is transmitted to the game apparatus 1b. First, when the game apparatus 1a and the game apparatus 1b are located within a range of the short-range communication, a communication connection is established on the basis of a condition that terminal type information that identifies the type of the game apparatus 1 and software type information that identifies the types of the game programs executed in the game apparatuses 1a and 1b are matched (step S11).

When the communication connection is established, the information stored in the transmitter side sub-character placement management table 40 in the game apparatus 1a and the status information such as the level and the offensive power of the main character and/or the sub-character of the game apparatus 1a are transmitted to the game apparatus 1b (step S12). Next, the information stored in the transmitter side sub-character placement management table 40 in the game apparatus 1b and the status information such as the level and the offensive power of the main character and/or the sub-character of the game apparatus 1b are received by the game apparatus 1a (step S13) and the receiver side sub-character placement management table 50 in the game apparatus 1a is updated on the basis of the received information of the sub-character (step S14).

If a predetermined time has not elapsed since the communication connection of the game apparatuses 1a and 1b was established, even if the game apparatuses 1a and 1b are located within a range in which the communication connection is possible, the game apparatuses 1a and 1b do not exchange the information related to the sub-character and disconnect the communication connection. In this case, load of the communication process can be reduced.

Next, when the game apparatus 1a transmits the information related to the sub-character to the game apparatus 1b, a privilege given to the sub-character of the game apparatus 1a is calculated (step S15). The privilege is calculated according to the status such as the level and the offensive power of the sub-character of the game apparatus 1a, the status such as the level and the offensive power of the main character or the sub-character of the game apparatus 1b, and the content of the mission selected when the sub-character is placed in the game apparatus 1a.

Figures 10, 11:
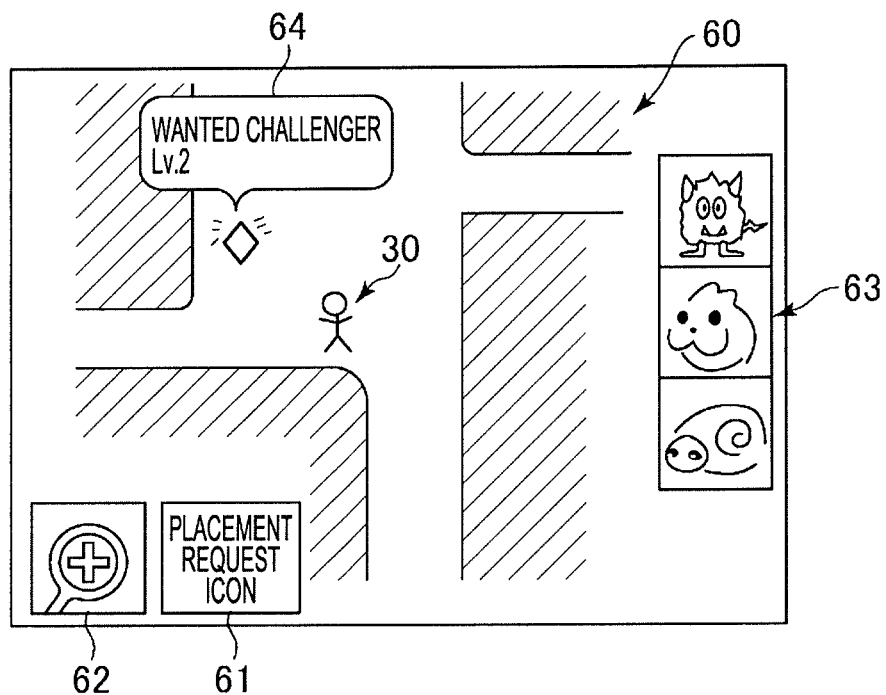
FIG. 10 is a diagram showing an example of a game image displayed on a second display of the game apparatus according to the embodiment of the present invention.
FIG. 11 is a diagram showing a relationship between the degree of difficulty, evaluation score, and winning evaluation.

For example, the higher value of the offensive power and a magic power of the sub-character of the game apparatus 1a and the higher value of the offensive power and a magic power of the main character of the game apparatus 1b are summed up and the summed value is multiplied by a coefficient that randomly varies in a predetermined range, so that an evaluation score is calculated. Further, the degree of difficulty is determined for each mission in advance and the degree of difficulty of the mission selected when the sub-character is placed in the game apparatus 1a is specified. Then, "winning evaluation" is obtained from the specified degree of difficulty and the calculated evaluation score. The winning evaluation is classified into five level evaluations from "1" to "5" as shown in FIG. 11 on the basis of the relationship between the degree of difficulty and the evaluation score. For example, when the evaluation score is greater than or equal to 10 and smaller than 15 and the degree of difficulty is A, the winning evaluation is 2 and when the evaluation score is greater than or equal to 55 and smaller than 70 and the degree of difficulty is C, the winning evaluation is 3. Here, "the degree of difficulty A" is the highest difficulty and the "the degree of difficulty C" is the lowest difficulty.

Experience points and an item which the placed sub-character can acquire are determined on the basis of the winning evaluation obtained based on the relationship as shown in FIG. 11. For example, the experience points which the sub-character can acquire can be calculated by multiplying the level of the sub-character by an experience point coefficient and further multiplying the above result by a coefficient randomly varies in a predetermined range. The higher the winning evaluation, and the higher the degree of difficulty of the mission, the larger the experience point coefficient can be. Regarding the item that can be acquired, it is possible to set so that the higher the winning evaluation and the higher the degree of difficulty of the mission, the larger the effects the item exerts in the game and the more valuable the item can be.

Also, a configuration may be adopted in which the privilege given to the sub-character changes according to the content of the mission selected when the sub-character is placed in the game apparatus 1a. FIG. 8 is a diagram showing an example of a relationship between the content of the selected mission and the privilege that the sub-character can acquire by transmitting the sub-character information.

For example, the player can select a mission such as "guard successfully three times," "prohibit three or more damages" and "prohibit use of command other than attack command" as the content of the mission. However, the privilege that the sub-character can acquire (for example, the type of status that improves) changes according to the selected mission. When the mission is "guard successfully three times," the offensive power of the sub-character increases, and when the mission is "prohibit three or more damages," the magic power of the sub-character increases.

In this way, the privilege that the sub-character can acquire changes according to the content of the mission, so that the player who plays in the game apparatus 1 can select a mission according to the privilege which the player wants to give to the sub-character, and thus it is required that the player more strategically places the sub-character.

Regarding the calculation of the privilege in step S15, a configuration may be adopted in which the higher the level of the sub-character of the game apparatus 1a is than the level of the main character of the game apparatus 1b, the smaller the experience points and the virtual currency that the sub-character can acquire are, and also the smaller a value by which a parameter improves is, and on the other hand, the lower the level of the sub-character of the game apparatus 1a is than the level of the main character of the game apparatus 1b, the larger the experience points and the virtual currency that the sub-character can acquire are, and also the larger a value by which a parameter improves is.

When the privilege is calculated in step S15, the privilege is given to the sub-character (step S16), and the experience points, a held item, and a parameter of the sub-character which are stored in the WRAM 22 of the game apparatus 1a are updated. Then, a communication result such as a player name or a player character name (or names) to whom the information is transmitted, the number of players to whom the information is transmitted, and the experience points and the item that the sub-character acquires is displayed on the first display 11 of the game apparatus 1a (step S17) and a series of processes are completed.

Although not shown in FIG. 7, a fight result estimated in a case in which the transmitted sub-character fights against the player character of the game apparatus 1b may be simulated and the simulation result may be displayed on the first display 11 of the game apparatus 1a. In this case, for example, as a result of a battle against the main character of the game apparatus 1b, a message such as "Sub-character is defeated although damaging the main character A of level 10 by XX points" or "Sub-character wins although being damaged by the main character A of level 10 by XX points."

The estimate of the battle result is calculated by performing a fight simulation to obtain a result as if the real battle were performed, on the basis of the status information such as the level and the offensive power of the sub-character transmitted from the game apparatus 1a and the status information such as the level and the offensive power of the main character of the game apparatus 1b received in step S13.

If the sub-character wins as a result of the simulation of the fight between the sub-character of the game apparatus 1a and the main character of the game apparatus 1b, it is possible to form a configuration in which the experience points and the virtual currency that can be acquired by the sub-character are larger than those when the sub-character is defeated and a value by which the parameter such as the offensive power of the sub-character improves is also large.

Although even when the information related to the sub-character placed in the game apparatus 1a is transmitted to the game apparatus 1b, in the game apparatus 1b, the main character does not encounter the sub-character of the game apparatus 1a soon and fight against the sub-character, the data exchange is performed with the different game apparatus 1b, so that the privilege is given to the sub-character in steps S16 and S17 even when the real fight is not performed and the result thereof is displayed, and thus it is possible to give a feeling as if a communication fight were really performed to the player of the game apparatus 1a. For the player of the game apparatus 1a, there is an advantage that the sub-character can be automatically grown, without feeling bothersome, even when the player does not carry out an operation to perform a real fight by communication.

A configuration may be adopted in which the sub-character placed in the game apparatus 1a cannot participate in a virtual battle against an enemy character while the game progresses in the game apparatus 1a unless the sub-character is released from an object to be dispatched to a different game apparatus 1, that is, as long as the sub-character is registered in the transmitter side sub-character placement management table 40. By adopting such a configuration, the player needs to select whether a plurality of sub-characters fight against the enemy character on the game field with the main character or automatically grow as an object to be dispatched to a different game apparatus 1. As a result, the player needs to strategically grow the sub-characters and proceed with the game, so that the interest of the game increases.

Regarding the sub-character placed on the game field as an object to be dispatched to a different game apparatus 1, the sub-character may be automatically released from the object to be dispatched when the information related to the sub-character is transmitted to the different game apparatus 1 or the information related to the sub-character can be continuously transmitted to a plurality of game apparatuses 1 unless the player releases the sub-character from the object to be dispatched.

Although the data exchange process between the game apparatuses is described above with reference to FIG. 7, in an area such as an urban area and a downtown area in which the population is large, when the game apparatus is carried around while the game program is being executed, the game apparatus performs the short-range communication with other game apparatuses 1 even in a short period of time and the data exchange is performed. However, in an area in which the population is relatively small, the frequency, by which the game apparatus performs the short-range communication with other game apparatuses 1 and the data exchange is performed, is low, so that the interest of the game decreases.

To prevent such a problem, if the data exchange is not performed even when a predetermined time has elapsed since the sub-character was placed in the game apparatus 1*a*, a configuration may be adopted in which the virtual battle result is automatically displayed and the privilege is given to the sub-character. In this case, the level and the status of the main character to be a virtual opponent are randomly determined and the simulation of the fight result is performed according to the determined level and the status to calculate the privilege.

FIG. 9 is a diagram showing an example of a game image displayed on the first display of the game apparatus. On the first display 11, a two-dimensional game image obtained by perspectively transforming a situation in a three-dimensional virtual space on a virtual screen is displayed. In the game image, a main character 30, a sub-character 31 that acts according to the main character 31, and an enemy character 32 that opposes the main character 30 and the sub-character 31 are displayed. Also, the physical strength values of the main character 30 and the sub-character 31 are displayed. When the physical strength value becomes "0," the main character 30 is in a state of knocked out.

FIG. 10 is a diagram showing an example of a game image displayed on the second display of the game apparatus. On the second display 12, a field map 60, which represents all or part of the game field in a plan view as seen from the above, is displayed. The player can know where the main character 30 is located and how to move the main character 30 to a desired position by referring to the field map 60.

A placement request icon 61 is displayed on the second display 12. When touching the placement request icon 61, the sub-character can be placed at a position where the main character 30 is located. The sub-character to be placed is selected from sub-character icons 63 by a touch operation. When the sub-character icon 63 is selected and the content of the event is determined, the sub-character is placed. When a communication connection is established with a different game apparatus 1, the status information of the placed sub-character and the information related to the position where the sub-character is placed are transmitted and the sub-character is placed at the same position in the different game apparatus 1. The field map 60 can be enlarged and reduced by touching a map zoom icon 62.

On the second display 12, a balloon 64 is displayed on the field map 60. The balloon 64 corresponds to information related to a sub-character received from the different game apparatus 1 and when the balloon 64 is touched, a battle against the sub-character received from the different game apparatus is started.

The category of the game to which the present invention is applied is not particularly limited if the game progresses while the player character is moving on the game field. For example, the present invention can be applied to an RPG, a shooting game, and an action game.

What is claimed is:

1. A game system, comprising:
a first game apparatus and a second game apparatus which are configured to communicate with each other,
wherein a game, which progresses in the first game apparatus, progresses by moving a player character on a game field,
the first game apparatus includes:
a processor that, when progressing the game, performs operations including:
indicating a position, on the game field in the second game apparatus, corresponding to a first position where a first object is placed on the game field when the game progresses; and
deciding content of an event generated in the second game apparatus; and
a transmitter that transmits information related to the position indicated by the processor and event information related to the content of the event decided by the processor, and the second game apparatus includes:
a receiver that receives the information related to the position and the event information; and
a processor that, when progressing the game, performs operations including:
placing a second object on the position on the game field corresponding to the first position indicated by the first game apparatus in accordance with the information received by the receiver; and
generating the event, based on the position where the second object is placed by the object placer, corresponding to the event information.

2. The game system according to claim 1, wherein the event is one of:
a first virtual battle between the player character and a second player character corresponding to the second game apparatus; and
a second virtual battle between the second player character and an enemy character, the player character fighting the second virtual battle in cooperation with the second player character.

3. The game system according to claim 2, wherein the player selects, after dispatching the first object to the arbitrary position on the game field, whether a mission of the first object is to one of fight and cooperate with the second player character during the event.

4. A non-transitory computer-readable recording medium including a game program that causes a computer apparatus to execute a game which progresses by moving a player character on a game field, the game program causing the computer apparatus to perform operations including:
indicating a position, on the game field in an other game apparatus, corresponding to a position where an object is placed on the game field when the game progresses;

deciding content of an event generated in the other game apparatus; and transmitting information related to the position indicated by the position indicator and event information related to the content of the event decided by the deciding to the other game apparatus.

5. A computer including the non-transitory computer-readable recording medium according to claim 4.

6. A non-transitory computer-readable recording medium including a game program that causes a computer apparatus to execute a game which progresses by moving a player character on a game field, the game program causing the computer apparatus to perform operations including:

receiving information related to a position on the game field corresponding to a position indicated by an other game apparatus and event information related to content of an event decided by the other game apparatus from the other game apparatus;

placing an object on the position on the game field corresponding to the position indicated by the other game apparatus in accordance with the information received by the receiving; and generating the event, based on the position where the object is placed by the placing, corresponding to the event information.

7. A computer including the non-transitory computer-readable recording medium according to claim 6.

* * * * *